(12) United States Patent
Ganai

(10) Patent No.: US 8,707,272 B2
(45) Date of Patent: Apr. 22, 2014

(54) SCENARIO DRIVEN CONCURRENCY BUGS: MODEL AND CHECK

(75) Inventor: Malay Ganai, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 224 days.

(21) Appl. No.: 13/343,361

(22) Filed: Jan. 4, 2012

(65) Prior Publication Data

US 2012/0174074 A1 Jul. 5, 2012

Related U.S. Application Data

(60) Provisional application No. 61/429,533, filed on Jan. 4, 2011.

(51) Int. Cl.
*G06F 9/44* (2006.01)
*G06F 9/45* (2006.01)

(52) U.S. Cl.
USPC ............ 717/126; 717/104; 717/128; 717/136

(58) Field of Classification Search
None
See application file for complete search history.

(56) References Cited

U.S. PATENT DOCUMENTS

| | | | | |
|---|---|---|---|---|
| 6,173,309 | B1* | 1/2001 | Kirshenbaum et al. | 717/164 |
| 7,316,005 | B2* | 1/2008 | Qadeer et al. | 717/131 |
| 7,716,645 | B2* | 5/2010 | Dolby et al. | 717/126 |
| 7,779,382 | B2* | 8/2010 | Rehof et al. | 717/104 |
| 7,865,778 | B2* | 1/2011 | Duesterwald et al. | 717/126 |
| 8,381,226 | B2* | 2/2013 | Kahlon et al. | 717/131 |
| 2004/0025144 | A1* | 2/2004 | Yang | 717/128 |
| 2008/0052681 | A1* | 2/2008 | Yang | 717/128 |
| 2009/0125887 | A1* | 5/2009 | Kahlon et al. | 717/126 |
| 2010/0192131 | A1* | 7/2010 | Dolby et al. | 717/126 |
| 2010/0281469 | A1* | 11/2010 | Wang et al. | 717/128 |
| 2011/0167412 | A1* | 7/2011 | Kahlon et al. | 717/128 |
| 2011/0219361 | A1* | 9/2011 | Dolby et al. | 717/136 |

OTHER PUBLICATIONS

Alexander Egyed, A Scenario-Driven Approach to Trace Dependency Analysis, Feb. 2003 IEEE vol. 29 No. 2, [Retrieved on Apr. 19, 2013]. Retrieved from the internet: <URL: http://ieeexplore.ieee.org/stamp/stamp.jsp?tp=&arnumber=1178051> 17 Pages (116-132).*

Mahdi Fazeli et al., A Software-Based Concurrent Error Detection Technique for PowerPC Processor-based Embedded Systems, 2005 IEEE, [Retrieved on Apr. 19, 2013]. Retrieved from the internet: <URL: http://ieeexplore.ieee.org/stamp/stamp.jsp?tp=&arnumber=1544525> 9 Pages (266-274).*

* cited by examiner

*Primary Examiner* — Don Wong
*Assistant Examiner* — Anibal Rivera
(74) *Attorney, Agent, or Firm* — Joseph Kolodka; Jeffery Brosemer

(57) ABSTRACT

A computer implemented testing methodology employing a scenario-driven modeling of specific instances of bug patterns that commonly occur in concurrent programs which encodes these instances in an SMT-based symbolic analysis. Such modeling and encoding advantageously allow the symbolic analysis framework to focus on real bugs, thereby allowing effective utilization of resources. Experimentation determined a number of previously unknown bugs in public benchmarks and advantageously scenario-specific modeling and encoding improves the scalability of symbolic technique and, therefore, improves overall quality of concurrency testing.

6 Claims, 15 Drawing Sheets

Thread $M_1$ int $n$; char* $p = 0$;  /* global */
char* $p = 0$;

$t_1$   $n := 10$;
$t_2$   $p := \mathtt{malloc}(10)$;
$t_3$   $p[n-1] := 0$;
$t_9$   $\mathtt{free}(p)$;
$t_{10}$  $p := 0$;

Thread $M_2$

$t_4$   $n + +$;
$t_5$   $q := \mathtt{realloc}(p, n)$;
$t_6$   $p := q + n - 1$;
$t_7$   $p[0] := 0$;
$t_8$   $p := q$;

*FIG. 4*

Algorithm 1 FindAtomicityViolation: Iterative procedure for finding atomicity violation 1: input: Given a set $\mathcal{E}\text{-}AT, NAV, \Omega_{CC}$
2: output: Return $\rho$/$NULL$ if atomicity violation found/not found
3:   $NAV' := NAV$ {Initialize violation constraint}
4: while true do
5:     $(is\_sat, \rho) := \texttt{SMT\_Check}(\Omega_{CC} \wedge NAV')$
6:     if $(is\_sat = true)$
7:         if($\texttt{Is\_Serializable}(\mathcal{E}\text{-}AT, \rho) = false$)
8:             $cls := \texttt{Blocking\_Cls}(\rho)$
9:             $NAV' := NAV' \wedge cls$
10:        else
11:            return $\rho$ {Found a violation}
12:    else
13:        return $NULL$ {No violation found}
14:    endif
15: end while

FIG. 7

| Ex | Characteristics | | | | | MAT analysis | | | | Prop | | quad | | cubic | |
|---|---|---|---|---|---|---|---|---|---|---|---|---|---|---|---|
| | n | #L | #G | #A | #t | #M | #C | #T | t(s) | type | #prp | #S/#U/#? | t(s) | #S/#U/#? | t(s) |
| aget-3-A | 3 | 97 | 14 | 1117 | 883 | 30K | 33K | 469 | 5 | A | 119 | 119/0/0 | 351 | 26/0/93 | TO |
| aget-7-A | 7 | 104 | 34 | 1226 | 1003 | 55K | 62K | 500 | 1 | A | 99 | 99/0/0 | 337 | 21/0/78 | TO |
| aget-11-R | 11 | 121 | 54 | 1310 | 1107 | 62K | 70K | 520 | 1 | A | 94 | 94/0/0 | 600 | 21/0/73 | TO |
| pfs-3-O | 3 | 32 | 32 | 3912 | 3909 | 458 | 588 | 55 | <1 | O | 7 | 7/1/0 | 5 | 7/1/0 | 7 |
| pfs-3-A | 3 | 32 | 32 | 3912 | 3909 | 458 | 588 | 55 | <1 | A | 7 | 7/0/0 | 814 | 7/0/0 | 1246 |
| pfs-7-O | 7 | 39 | 31 | 4042 | 3995 | 1652 | 2158 | 951 | <1 | O | 7 | 6/1/0 | 27 | 6/1/0 | 198 |
| pfs-7-A | 7 | 39 | 31 | 4042 | 3995 | 1652 | 2158 | 951 | <1 | A | 3 | 3/0/0 | 481 | 3/0/0 | 1340 |
| pfs-11-O | 7 | 39 | 31 | 4042 | 3995 | 1652 | 2158 | 951 | <1 | O | 8 | 7/1/0 | 277 | 7/1/0 | 1121 |
| axel-3-O | 3 | 357 | 34 | 1269 | 1668 | 28k | 29k | 794 | 4 | O | 1 | 1/0/0 | 26 | 0/0/1 | abrt |
| axel-3-A | 3 | 357 | 34 | 1269 | 1668 | 28k | 29k | 794 | 4 | A | 19 | 19/0/0 | 1298 | 2/0/17 | abrt |
| axel-7-O | 7 | 400 | 88 | 2883 | 3358 | 52k | 56k | 2278 | 3 | O | 14 | 14/0/0 | 245 | 0/0/14 | abrt |
| axel-7-A | 7 | 400 | 88 | 2883 | 3358 | 52k | 56k | 2278 | 3 | A | 15 | 15/0/0 | 1062 | 0/0/15 | abrt |
| axel-11-O | 11 | 459 | 136 | 4335 | 4942 | 64k | 71k | 3636 | 9 | O | 23 | 23/0/0 | 522 | 0/0/23 | abrt |
| bzip-4-O | 4 | 45 | 326 | 1588 | 1574 | 2327 | 2603 | 184 | <1 | O | 3 | 2/1/0 | 40 | 2/1/0 | 307 |
| bzip-8-O | 8 | 44 | 327 | 1613 | 1601 | 2426 | 2765 | 193 | <1 | O | 3 | 2/1/0 | 40 | 2/1/0 | 600 |
| bzip-12-O | 12 | 49 | 326 | 1635 | 1633 | 2547 | 2971 | 208 | <1 | O | 3 | 2/1/0 | 44 | 1/1/1 | TO |

Notes: $n$: num. of threads. #L: num. of local vars. #G: num. of global vars.
A: num. of global accesses. #t: num. of transitions. #M: num. of MATs.
C: num. of context switches. #T: num. of ind. transactions. A: atomicity. O: order violation
t(s): time in sec (TO: t > 1800s), abrt: SMT solver aborted due to mem out

FIG. 8

Improper resource allocation scenario

Model dynamic memory allocation
Using type state {O,F,M} p = realloc(q)
Model: if (q != p) q = F, p=M

P = malloc()
Model: p = M free(p)
Model: p = F

Deref(p)
Model: p = D

Encoding memory errors conditions

Memory Leak:
condition: Race (p=M,p=M)

Double free:
Condition: Race<(p=F,p=F)

Null pointer deref:
Condition: Race<(p=O, p=D)

Use of dangling pointer:
Condition: Race<(p=F,p=D)

Note: Race(a,b) is the encoding condition where "a" occurs before "b" or vice versa, with out any conflict access on "a" or "b". Race<(a,b) is the encoding condition where "a" occurs before "b" without any conflict access on 'a'.

*FIG. 14*

SCENARIO DRIVEN CONCURRENCY BUGS: MODEL AND CHECK

CROSS REFERENCE TO RELATED APPLICATIONS

This application claims the benefit of U.S. Provisional Patent Application No. 61/429,533 filed Jan. 4, 2011 and is related to U.S. patent application Ser. No. 13/316,123 filed Dec. 9, 2011 the contents of which is incorporated by reference as if set forth at length herein.

FIELD OF THE DISCLOSURE

This disclosure relates generally to the field of computer software and in particular to techniques for determining concurrency errors in computer software programs.

BACKGROUND OF THE DISCLOSURE

The growth of cheap and ubiquitous multi-processor systems and concurrent library support are making concurrent programming very attractive. However, verification of multi-threaded concurrent systems remains a daunting task especially due to complex and unexpected interactions between asynchronous threads. Unfortunately, testing a program for every interleaving on every test input is often practically impossible.

SUMMARY OF THE DISCLOSURE

An advance in the art is made according to an aspect of the present disclosure directed to a scenario-driven modeling of specific instances of bug patterns based upon common programming oversights including mismatched communication, improper resource utilization and non-atomic updates. Advantageously, such modeling according to an aspect of the present disclosure involves efficient encoding of violation conditions in a quantifier-free SMT formula which are then checked by symbolic analysis which significantly improves the likelihood of finding bugs.

BRIEF DESCRIPTION OF THE DRAWING

A more complete understanding of the present disclosure may be realized by reference to the accompanying drawings in which:

FIG. 4 shows a CTP with $M_1$ and $M_2$ threads where each transition is numbered in the order it was executed in the trace.

FIG. 7 is shows Algorithm 1 according to an aspect of the present disclosure;

FIG. 8 depicts Table 1 which is a comparison of time taken (in sec) by Symbolic Analysis according to an aspect of the present disclosure;

FIG. 14 is a schematic diagram depicting modeling and encoding of improper resource allocation scenario according to an aspect of the present disclosure.

DETAILED DESCRIPTION

Figure 1:
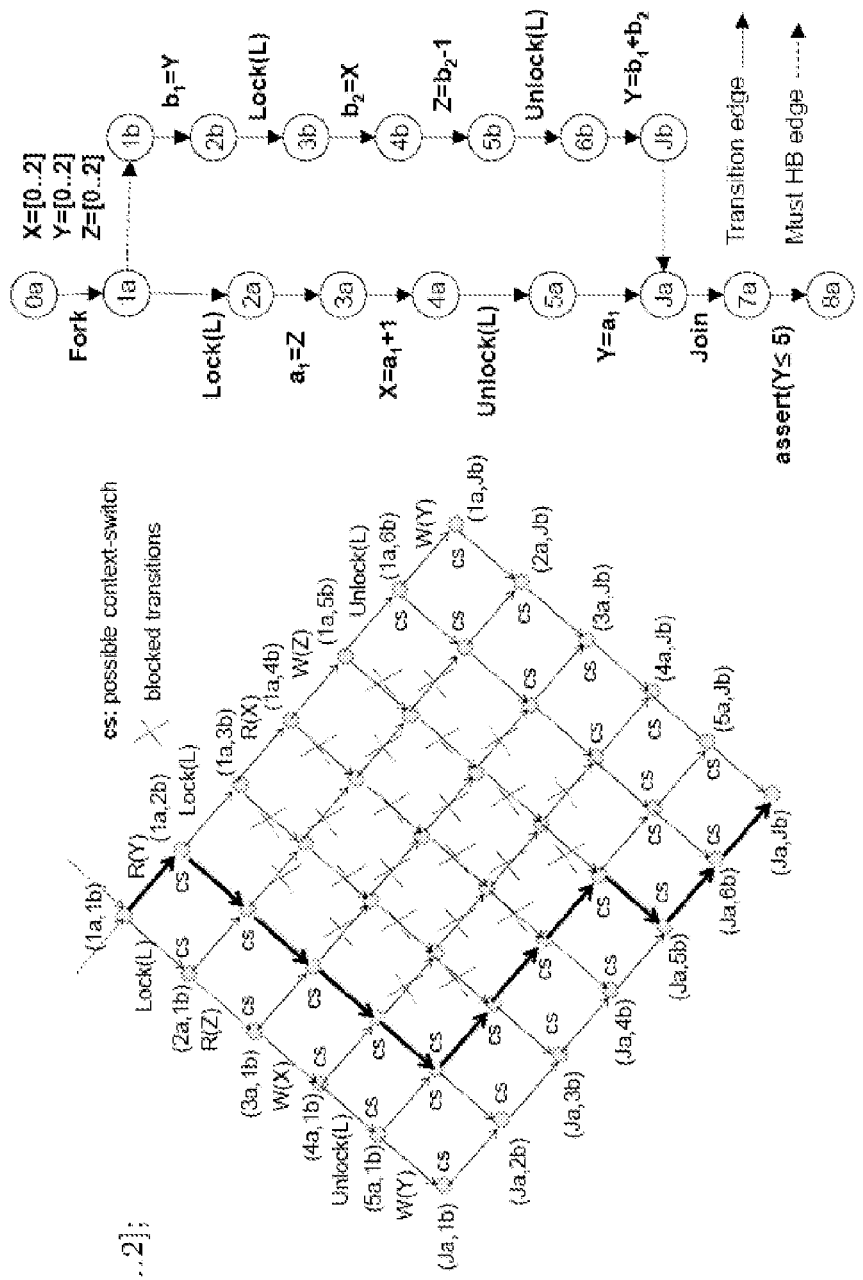
FIG. 1 depicts: (a) an exemplary concurrent system P with threads $M_a, M_b$ with local variables $a_i, b_i$ respectively, communicating with shared variables X,Y,Z,L; (b) lattice and a run $\sigma$, and (c) $CTP_\sigma$ as CCFG, according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and nonvolatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

1. Introduction

The growth of cheap and ubiquitous multi-processor systems and concurrent library support are making concurrent programming very attractive. However, verification of multi-threaded concurrent systems remains a daunting task especially due to complex and unexpected interactions between asynchronous threads. Unfortunately, testing a program for every interleaving on every test input is often practically impossible. Runtime-based program analysis infer and predict program errors from an observed trace. Compared to static analysis, runtime analysis often result in fewer false alarms.

Heavy-weight runtime analysis such as dynamic model checking and satisfiability-based symbolic analysis, search for violations in all feasible alternate interleavings of the observed trace and thereby, report a true violation if and only if one exists.

In dynamic model checking, for a given test input, systematic exploration of a program under all possible thread interleavings is performed. Even though the test input is fixed, explicit enumeration of interleavings can still be quite expensive. Although partial order reduction techniques (POR) reduce the set of necessary interleavings to explore, the reduced set often remains prohibitively large. Some previous work used ad-hoc approaches such as perturbing program execution by injecting artificial delays at every synchronization points, or randomized dynamic analysis to increase the chance of detecting real races.

In trace-based symbolic analysis, explicit enumeration is avoided via the use of symbolic encoding and decision procedures to search for violations in a concurrent trace program (CTP). A CTP corresponds to data and control slice of the concurrent program (unrolled, if there is a thread local loop), and is constructed from both the observed trace and the program source code. One can view a CTP as a generator for both the original trace and all the other traces corresponding to feasible interleavings of the events in the original trace.

Previously, we have introduced mutually atomic transaction (MAT)-based POR technique to obtain a set of context-switches that allow all and only the representative interleavings. We now present the details of scenario-driven modeling and checking of concurrency bugs in a MAT-reduced symbolic analysis used in our concurrency testing framework to improve the likelihood of finding real bugs.

We present detailed modeling steps of specific instances of bug patterns based on common programming errors such as mismatched communication, improper resource utilization and non-atomic updates (of one or more variables). Such modeling corresponds to efficient encoding of violation conditions in a quantifier free SMT formula, which are then checked for satisfiability on out MAT-based symbolic analysis.

Specifically, we first use MAT analysis to obtain a set of independent transactions and their interactions. We model scenario-specific independent transactions so that a feasible interleaving in the model is a valid bug-triggering interleaving. We use MAT-based symbolic techniques to search for such big-interleavings in all feasible interleavings of observed events. In essence, we utilize the resources effectively by focusing on the most likely causes of unintended program behaviors.

2. Related Work

We now survey various SMT/SAT-based symbolic approaches to search for bounded length witness traces to concurrency errors. Based on how satisfiability formula are generated, symbolic approaches can be broadly categorized into two types namely, 1) synchronous (i.e., with scheduler) and 2) asynchronous (i.e., without scheduler) approaches.

In the synchronous category, a synchronous model of a concurrent program is constructed with a scheduler, and BMC is used to generate satisfiability formula. Such a model is constructed based on interleaving semantics, where at most one thread transition is scheduled to execute at a time. The scheduler is then constrained to allow context-switch between accesses that are conflicting, i.e., accesses whose relative execution order can produce different global system states. Some researchers have employed sound abstraction with bounded number of context switches (i.e., under-approximation), while others have used finite-state model abstractions, combined with proof-guided method to reduce the set of allowed context switches.

In the asynchronous category, satisfiability formula are generated directly without constructing a synchronous model of concurrent programs, i.e., without using a scheduler. The concurrency constraints that maintain sequentially consistency are included in the formula for a bounded depth analysis.

In the CSSA-based approaches, read-value constraints are added between each read and write accesses (on a shared variable), combined with happens-before constraints ordering other writes (on the same variable) relative to the pair.

In the token-based approach, a single-token system of decoupled threads is constructed first, and then token-passing and memory consistency constraints are added between each pair of shared accesses such that all and only sequential consistent schedules are allowed.

There have been parallel efforts to detect bugs for weaker memory models using axiomatic memory style specifications combined with constraint solvers, where ordering is encoded explicitly between all pairs of relevant events (shared accesses), resulting in a cubic formulation (in the worst case) in the number of shared accesses, like.

The presented approach is inspired by our token-based approach proposed originally for the entire concurrent program. Instead of explicit token passing constraints, we use transaction sequence constraints to keep the encoding simpler and succinct for trace programs. This in turn makes the presented approach easier to comprehend and implement. Unlike other symbolic approaches, our encoding does not require a priori limit on context-bounding.

3. Concurrent System

A multi-threaded concurrent program P comprises a set of threads and a set of shared variables, some of which, such as locks, are used for synchronization. Let $M_i$ ($1 \le i \le N$) denote a thread model represented by a control and data flow graph of the sequential program it executes. Let $V_i$ be a set of local variables in $M_i$ and $\mathcal{V}$ be a set of (global) shared variables. Let $C_i$ be a set of control states in $M_i$. Let $\mathcal{S}$ be the set of global states of the system, where a state $s \in \mathcal{S}$ is a valuation of all local and global variables.

A thread transition t is a 4-tuple $<c,g,u,c'>$ that corresponds to a thread $M_i$, where c, c' $\in C_i$ represent the control states of $M_i$, g is an enabling condition (or guard) defined on $V_i \cup \mathcal{V}$, and u is a set of update assignments of the form v:=exp where variable v and variables in expression exp belong to the set $V_i \cup \mathcal{V}$. Let tid(t) denote the corresponding thread of the transition t. We assume each transition t is atomic, i.e., uninterruptible. Let $pc_i$ denote a thread program counter of thread $M_i$. For a given transition $t=<c,g,u,c'>$, and a state $s \in \mathcal{S}$, if g evaluates to true in s, and $pc_i=c$, we say that t is enabled in s.

A schedule of the concurrent program P is an interleaving sequence of thread transitions $\rho = t_1 \ldots t_k$. An event e occurs when a unique transition t is fired, which we refer to as the generator for that event, and denote it as t=gen(P,e). A run (or concrete execution trace) $\sigma = e_1 \ldots e_k$ of a concurrent program P is an ordered sequence of events, where each event $e_i$ corresponds to firing of a unique transition $t_i$=gen(P,$e_i$). We illustrate the differences between schedules and runs later in this disclosure.

Given a run $\sigma = e_1 \ldots e_k$ for a program P we say $e_i$ happens-before $e_j$, denoted as $e_i \prec e_j$ if i<j. Let t=gen(P,e) and t'=gen(P,e'). We say $t \prec t'$ iff $e \prec e'$. For some $\sigma$, if $e \prec e'$ and tid(t)=tid(t'), we say $e \prec_{po} e'$ and $t \prec_{po} t'$, i.e., the events and the transitions are in thread program order. If $t \prec t'$ always and tid(t)≠tid(t'), we refer to such a relation as must happen-before (or must-HB, in short), and denote it as $t \prec_{HB} t'$. We observe such must-HB relation during fork/join, and wait/notify. In the sequel, we restrict the use of must-HB relation to inter-thread events/transitions only.

Dependency Relation ($\mathcal{D}$): Given a set T of transitions, we say a pair of transitions (t,t') $\in$ T×T is dependent, i.e. (t,t') $\in \mathcal{D}$ iff one of the following holds (a) $t \prec_{po} t'$, (b) $t \prec_{HB} t'$, (c) (t,t') is conflicting, i.e., accesses are on the same global variable, and at least one of them is a write access. If (t,t') $\notin \mathcal{D}$, we say the pair is independent.

Equivalency Relation ($\simeq$): We say two schedules $\rho_1 = t_1 \ldots t_i \cdot t_{i+1} \ldots t_n$ and $\rho_2 = t_1 \ldots t_{i+1} \cdot t_i \ldots t_n$, are equivalent if ($t_i$, $t_{i+1}$) $\notin \mathcal{D}$. An equivalent class of schedules can be obtained by iteratively swapping the consecutive independent transitions in a given schedule. A representative schedule refers to one of such an equivalent class.

A transaction is an uninterrupted sequence of transitions of a particular thread as observed in a system execution. We say a transaction (of a thread) is atomic w.r.t. a schedule, if the corresponding sequence of transitions are executed uninterrupted, i.e., without an interleaving of another thread in-between. For a given set of schedules, if a transaction is atomic w.r.t. all the schedules in the set, we refer to it as an independent transaction, (denoted as $\mathcal{J}$-transaction) w.r.t. the set.

Mutually Atomic Transactions (MAT): Two transactions $tr = t_f \ldots t_l$ and $tr' = t'_{f'} \ldots t'_{l'}$ corresponding to thread M and M' are mutually atomic iff except for the last pair i.e., $t_l, t'_{l'}$, all other transition pairs in the corresponding transactions are independent. All the interleavings of these transactions are equivalent to interleaving either tr·tr' or tr'·tr, and therefore one can avoid interleaving them in-between. Note, tr·tr' ≠ tr'·tr.

Concurrent Trace Program (CTP): Given a concrete execution trace $\sigma = e_1 \ldots e_k$, a concurrent trace program w.r.t. $\sigma$ and concurrent program P, denoted as $CTP_\sigma$, is a partial ordered set ($T_\sigma, \prec_\sigma$) such that $T_\sigma = \{t|t=gen(P,e)$ where $e \in \sigma\}$ is the set of generator transitions, and $t \prec_\sigma t'$ iff $\exists t, t' \in T_\sigma t \prec_{po} t$ or $t \prec_{HB} t'$. One can view a CTP as a generator for both the original schedule and all the other schedules by interleaving transitions of $\sigma$ as per $\prec_\sigma$. Two $CTP_\sigma$ and $CTP_\psi$ can be merged to obtain $CTP_\tau = (T_\tau, \prec_\tau)$ where $T_\tau := T_\sigma \cup T_\psi$ and $t \prec_\tau t'$ iff $t \prec_\sigma t'$ or $t \prec_\psi t'$ holds. A merged CTP can be effectively represented as a CCFG (concurrent control flow graph) with branching structure but no loop. In the sequel, we refer to such a merged CTP as a CTP.

Sequentially consistency: A schedule is sequentially consistent iff (a) transitions are in total order, (b) transitions of the same thread are in the program order, (c) each shared read access gets the last data written at the same address location in the total order, and (d) synchronization semantics is maintained. In the sequel, we also refer to such a sequentially consistent schedule as a feasible schedule. We extend the definition of sequential consistency and feasibility to a sequence of $\mathcal{J}$-transactions.

A data race corresponds to a global state where two different threads can access the same shared variable simultaneously, and at least one of them is a write.

4. Overview

In this section, we present an overview of our approach with an example to guide the rest of our discussion. Consider a concurrent system P comprising interacting threads $M_a$ and $M_b$ with local variables $a_i$ and $b_i$, respectively, and shared (global) variables X,Y,Z,L. This is shown in FIG. 1(a) where threads are synchronized with Lock/Unlock. Thread $M_b$ is created and destroyed by thread $M_a$ using fork-join primitives. A thread transition (1b,true,$b_1$=Y,2b) (also represented as

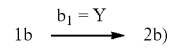

can be viewed as a generator of access event R(Y) corresponding to the read access of the shared variable Y.

FIG. 1(b) depicts a lattice representing the complete interleaving space of the program. Each node in the lattice denotes a global control state, shown as a pair of the thread local control states. An edge denotes a shared event write/read access of global variable, labeled with W(.)/R(.) or Lock(.)/Unlock(.). Note, some interleavings are not feasible due to Lock/Unlock, which we crossed out (X) in the figure. We also labeled all possible context switches with cs. The highlighted interleaving corresponds to a concrete execution (run) $\sigma$ of program P $$\sigma = R(Y)_b \cdot Lock(L)_a \ldots Unlock(L)_a \cdot Lock(L)_b \ldots$$
$$W(Z)_b \cdot W(Y)_a \cdot Unlock(L)_b \cdot W(Y)_b$$

where the suffices a, b denote the corresponding thread accesses.

The corresponding schedule $\rho$ of the run $\sigma$ is

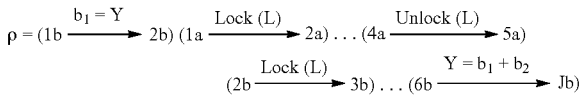

From $\sigma$ (and $\rho$), we obtain a slice of the original program called concurrent trace program (CTP). A CTP can be viewed as a generator of concrete traces, where the inter-thread event order specific to the given trace are relaxed. FIG. 1(c) show the $CTP_\sigma$ of the corresponding run $\sigma$ shown as a CCFG. Each node in CCFG denotes a thread control state (and the corresponding thread location), and each edge represents one of the following: thread transition, a possible context switch, and must-HB relation (such as fork/join). For clarity, we do not show edges that correspond to possible context switches (30 in total). Such a CCFG captures all the thread schedules of $CTP_\sigma$.

4.1. Mat-reduced Symbolic Analysis

The MAT-reduced symbolic analysis is conducted in four phases: In the first phase, for a given CTP, MAT-analysis is used to identify a subset of possible context switches such that all and only representative schedules are permissible.

In the second phase, a set of $\mathcal{J}$-transactions and a set of their interactions, referred henceforth as $\mathcal{J}$-interactions, are generated using the reduced set of possible context switches. Recall, an $\mathcal{J}$-transaction is atomic with respect to a set of schedules. Each $\mathcal{J}$-interaction is an ordered pair of $\mathcal{J}$-transactions. There are two types of $\mathcal{J}$-interactions: local, i.e., intra-thread and non-local, i.e., inter-thread. An $\mathcal{J}$-interaction (i,j) is local if $\mathcal{J}$-transactions i,j correspond to the same thread, and j follows i immediately in a program order. An $\mathcal{J}$-interaction (i,j) is non-local if $\mathcal{J}$-transactions i and j correspond to different threads, and there is a context switch from the end control state of i to the begin control state of j.

Figure 2:
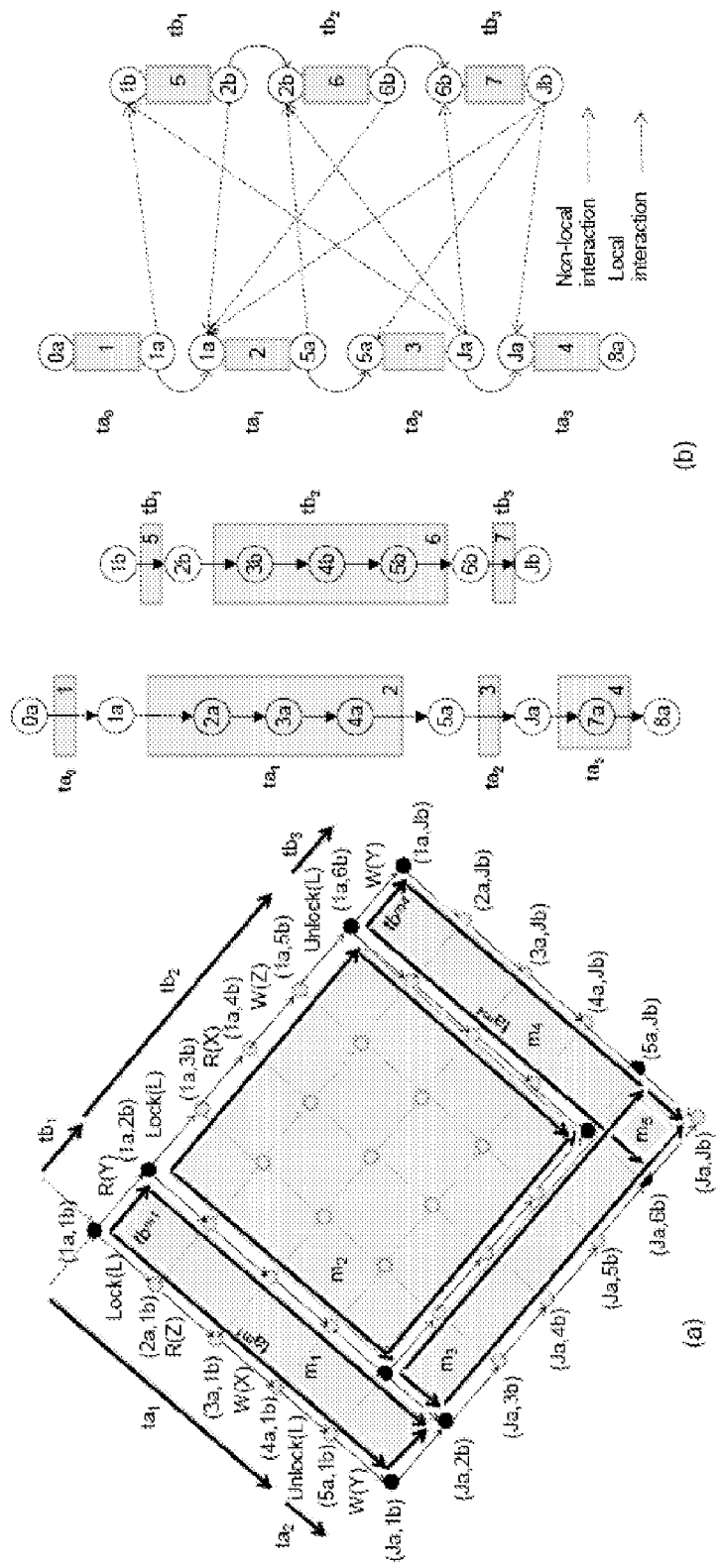
FIG. 2 shows: (a) MATs $\{m_1, \ldots, m_5\}$, and (b) $\mathcal{J}$-transactions, with local/non-local $\mathcal{J}$-interactions according to an aspect of the present disclosure.

As shown in FIG. 2(b), the $\mathcal{J}$-transaction sets corresponding to thread $M_a$ and $M_b$ are $AT_a=\{ta_0,ta_1,ta_2,ta_3\}$, and $AT_b=\{tb_1,tb_2,tb_3\}$, respectively. Their local $\mathcal{J}$-interactions are the ordered pairs: $(ta_0,ta_1)$, $(ta_1,ta_2)$, $(ta_2,ta_3)$, $(tb_1,tb_2)$, $(tb_2,tb_3)$, and non-local $\mathcal{J}$-interactions are the ordered pairs: $(ta_1,tb_2)$, $(ta_2,tb_1)$,$(ta_2,tb_2)$, $(ta_2,tb_3)$, $(tb_1,ta_1)$, $(tb_2,ta_1)$, $(tb_3,ta_1)$, $(tb_3,ta_2)$, $(ta_0,tb_1)$, and $(tb_2,ta_3)$. Note that last two non-local $\mathcal{J}$-interactions arise due to fork/join.

We then built an independent transaction model (ITM), where each $\mathcal{J}$-transaction is decoupled from the other. We introduce new symbolic variable for each global variable at the beginning of each $\mathcal{J}$-transaction. This independent modeling is needed to symbolically pair $\mathcal{J}$-transactions in some feasible sequence.

In the third phase, constraints are added to enforce sequential consistency. The sequential consistency requirement imposes certain restriction in the combination of $\mathcal{J}$-interactions. Total order requirement does not permit any cycles in any schedule. For example, a transaction sequence $ta_1 \cdot tb_2 \cdot ta_1$ is not permissible as it has cycle. Program order requirement is violated in a sequence $ta_1 \cdot tb_2 \cdot tb_3 \cdot ta_2 \cdot tb_1$, although it is a total ordered sequence.

We add transaction sequence constraints to allow only total and program order sequence of $\mathcal{J}$-transactions, based on $\mathcal{J}$-interactions. In addition, we add synchronization constraints to synchronize the global variables between the non-local $\mathcal{J}$-interactions, and synchronize the local variables between the local $\mathcal{J}$-interactions. Further, we add update constraints corresponding to the update assignments in a transition.

In the fourth phase, we infer and encode potential concurrency error conditions (as described later). The constraints added form a quantifier-free SMT formula, which is given to a SMT solver to check for its satisfiability. The formula is satisfiable iff there exists a sequentially consistent trace that witnesses the error condition.

4.2. MAT-based Partial Order Reduction

For a given CTP, there may be transition pairs with must-HB relation. As an optimization step (discussed later), we separate the fragments of interacting threads at corresponding transitions, so that each fragment, denoted as IF, does not have any transition pair with must-HB relation. MAT-analysis is then conducted on each fragment independently.

In the given example (FIG. 1(c)), the transition (0a, true, fork($M_b$),1a) must happen-before the transition (1b,true, $b_1$=Y,2b), and similarly, the transition (6b,true,Y=$b_1$+$b_2$,Jb) must happen before the transition (Ja,true,Join($M_b$),7). These transition pairs partition the CTP in three fragments: $IF_1$, $IF_2$ and $IF_3$ where $IF_1$ is between (0a, -) and (1a, 1b), $IF_2$ is between (1a, 1b) and (Ja,Jb), and $IF_3$ is between (Ja,Jb) and (8a, -). Note, $IF_2$ is the only interacting fragment. In the following, we discuss MAT-analysis for $IF_2$.

Consider a pair $(ta^{m_1},tb^{m_1})$, shown as the shaded rectangle $m_1$ in FIG. 2(a), where $ta^{m_1} \equiv Lock(L)_a \cdot R(Z)_a \ldots W(Y)_a$ and $tb^{m_1} \equiv R(Y)_b$ are transactions of threads $M_a$ and $M_b$, respectively. For the ease of readability, we use an event to imply the corresponding generator transition.

Note that from the control state pair (1a,1b), the pair (Ja,2b) can be reached by one of the two representative interleavings $ta^{m_1} \cdot tb^{m_1}$ and $tb^{m_1} \cdot ta^{m_1}$. Such a transaction pair $(ta^{m_1},tb^{m_1})$ is atomic pair-wise as one avoids interleaving them in-between, and hence, referred as Mutually Atomic Transaction, MAT for short [?]. Note that in a MAT only the last transition pair have shared accesses on the same variable, maybe co-enabled, and at least one of them being write. Other MATs $m_2 \ldots m_5$ are similar. In general, transactions associated with different MATs are not mutually atomic. For example, $ta^{m_1}$ in $m_1$ is not mutually atomic with $tb^{m_3}$ in $m_3$, where $tb^{m_3} \equiv Lock(L)_b \ldots W(Y)_b$.

The basic idea of MAT-based partial order reduction is to restrict context switching only between the two transactions of a MAT. A context switch can only occur from the ending of a transaction to the beginning of the other transaction in the same MAT. Such a restriction reduces the set of necessary thread interleavings. For a given MAT $\alpha=(f_i \ldots l_i,f_j \ldots l_j)$, we define a set TP($\alpha$) of possible context switches as ordered pairs, i.e., $TP(\alpha)=\{(end(l_i),begin(f_j)),(end(l_j),begin(f_i))\}$ where begin(t)/end(t) denote the beginning/ending control states of transition t. Note that there are exactly two context switches for any given MAT.

Let TP denote a set of possible context switches. For a given interacting fragment IF, we say the set TP is adequate iff for every feasible thread schedules of the IF there is an equivalent schedule that can be obtained by choosing context switching only between the pairs in TP. Given a set $\mathcal{MA}$ $\mathcal{A}$ of MATs, we define $TP(\mathcal{MJT})=\bigcup_{\alpha \in \mathcal{MAT}} TP(\alpha)$. A set $\mathcal{MAT}$ is called adequate iff $TP(\mathcal{MAT})$ is adequate. For a given IF, we use the algorithm GenMAT to obtain a set of $\mathcal{MAT}$ that allows all (i.e., adequate) and only representative (i.e., optimal) thread schedules, with a running cost $O(N^2 \cdot k^2)$, where N is number of threads, and k is the maximum number of shared accesses in a thread.

For the running example, a set $\mathcal{MAT}_{ab}=\{m_1, \ldots m_5\}$ of five MATs is generated. Each MAT is shown as a rectangle in FIG. 2(a). The total number of context switches allowed by the set, i.e., $TP(\mathcal{MAT}_{ab})$ is 8. The highlighted interleaving (shown in FIG. 1(b)) is equivalent to the representative interleaving $tb^{m_1} \cdot ta^{m_1} \cdot tb^{m_3}$. We show a run of GenMAT on the running example later.

4.3. MAT Analysis for CTP

Let $\mathcal{JF}$ denote the set of all fragments for a given CTP. For a given $IF_i \in \mathcal{JF}$, let $TP_i$ denote the set of context switches as obtained by MAT-analysis on $IF_i$. If $IF_i$ does not have interacting threads, then $TP_i=\emptyset$. Corresponding to each must-HB relation separating $IF_i$ and $IF_j$, denoted as $IF_i \prec_{HB} IF_j$, let $(c_i,c_j)$ denote an ordered pair of non-local control states such that $c_i$ must-happen before $c_j$. We obtain a set of context-switches for CTP, denoted as $T_{CTP}$, as follows:

$$TP_{CTP} := \bigcup_{IF_i \in \mathcal{J}\mathcal{F}} TP_i \cup \bigcup_{IF_i <_{HB} IF_j} (c_i, c_j)$$

Proposition 1: The set $TP_{CTP}$ captures all and only representative schedules of CTP.

Partitioning a CTP into fragments is an optimization step to reduce the set of infeasible context switches due to must-HB relation. We want to ensure that MAT-analysis does not generate such infeasible context switches in the first place. As per the claim above, such partitioning does not affect the set of schedules captured, although it reduces $TP^{CTP}$ significantly. For the running example, $T_{CTP}$ is given by $TP(\mathcal{M} \mathcal{A} \mathcal{T}_{ab}) \cup \{(1a,1b)(Jb,Ja)\}$.

A control state c is said to be visible if either $(c,c')/(c',c) \in TP_{CTP}$, i.e., either there is a context switch from/to c, respectively; otherwise it is invisible.

Given $TP_{CTP}$, we obtain a set of transactions of a thread $M_i$, denoted as $AT_i$, by splitting the sequence of program ordered transitions of $M_i$ into transactions only at the visible control states, such that a context switching can occur either to the beginning or from the end of such transactions. We define $\mathcal{J}$-AT and $\mathcal{J}$-ATP as follows:

$$\mathcal{J} - AT := \bigcup_{i=1}^{N} AT_i$$

$$\mathcal{J} - ATP := \{(a, b) \mid a, b \in AT, (end_a, begin_b) \in TP_{CTP}\}$$

where $begin_a/end_a$ are the begin/end control state of transaction a, respectively.

Proposition 2. $\mathcal{J}$-ATP is a set of $\mathcal{J}$-interactions that captures all and only representative schedules of CTP, and $\mathcal{J}$ is a set of $\mathcal{J}$-transactions.

For the running example, the sets $AT_a$ and $AT_b$ are: $AT_a = \{ta_0=0a \ldots 1a, ta_1=1a \ldots 5a, ta_2=5a\cdot Ja, ta_3=Ja \ldots 8a\}$ and $AT_b = \{tb_1=1b\cdot 2b, tb_2=2b \ldots 6b, tb_3=6b\cdot Jb\}$, as shown in FIG. 2(b). We also number each $\mathcal{J}$-transaction as shown in the boxes for our later references. For the interacting thread fragment i.e., $IF_2$, we show them as outlines of the lattice in FIG. 2(a). The local and non-local $\mathcal{J}$-interactions corresponding to $TP_{CTP}$ are shown in the FIG. 2(b).

Given a set of $\mathcal{J}$-transactions and a set of $\mathcal{J}$-interactions, we add concurrency constraints, denoted as $\Omega_{CC}$, that captures all and only sequential consistent sequence of $\jmath$-transactions.

4.4. Scenario-Based Modeling and Checking of Concurrency Bugs

Figure 3:
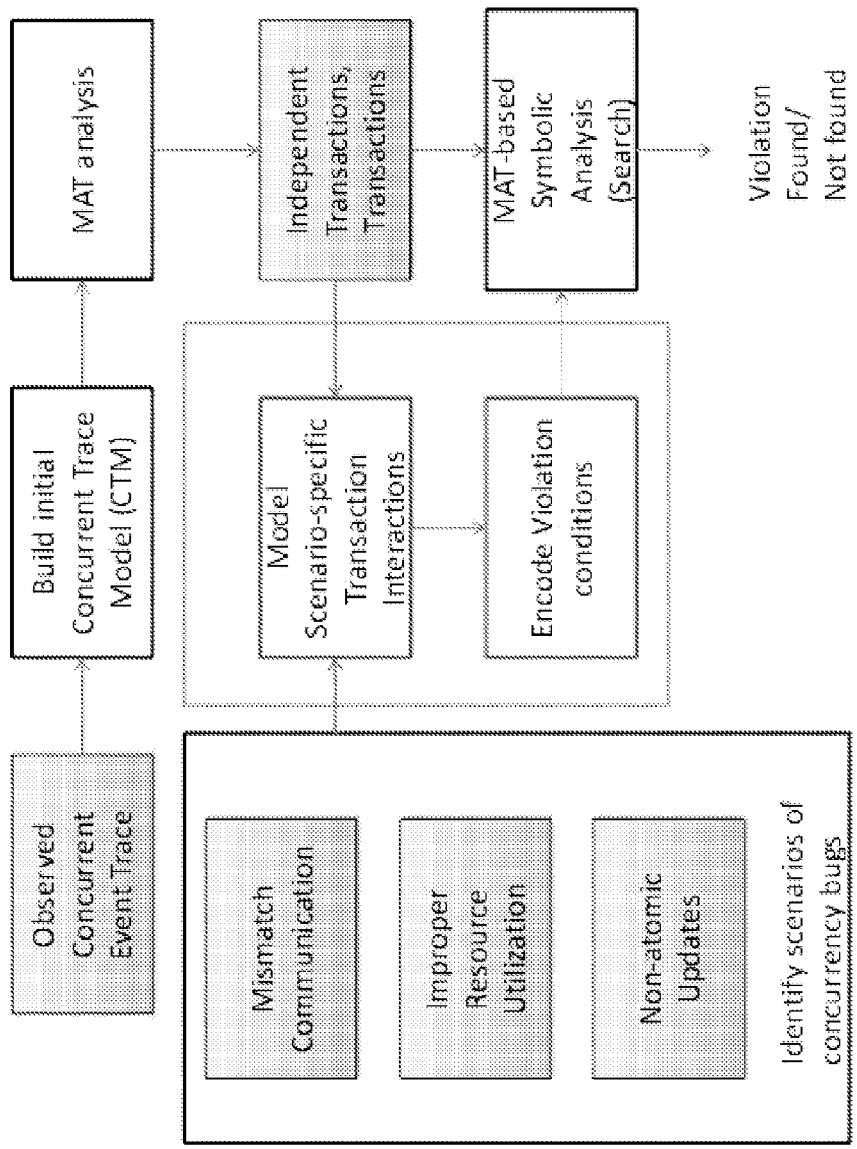
FIG. 3 depicts an overview of scenario-based modeling and checking of bugs according to an aspect of the present disclosure.

Our scenario-based modeling and checking of concurrency bugs are illustrated in FIG. 3. The main steps are shown therein and are described in the following.

With reference now to that FIG. 3, Given an observed concurrent event trace, corresponding to an execution of a concurrent program, we use the trace information to build an initial concurrent trace program. On the CTP, we carry out MAT analysis to obtain a set of independent transactions and their interactions.

We identify specific scenarios of bug patterns that correspond to program errors commonly cited in bug reports.

For a bug-pattern marked mismatch communication, we generate specific instances corresponding to mismatch wait/notify, send/receive synchronization pairs.

For a bug-pattern marked improper resource utilization, we generate specific instances corresponding to shared heap memory access errors such as invalid pointer access, invalid deallocation, and uninitialized reads.

For a bug-pattern marked non-atomic update, we generate specific instances based on inferring atomic region based on code layout and correlation of the shared variables.

For each of the specific scenarios of bug-patterns, we model transaction interactions corresponding to the instance of a bug-pattern. We encode violation condition corresponding to each bug instance into a quantifier free SMT formula.

We perform MAT-based symbolic analysis using the encoded violation condition as property constraints to search for a feasible interleaving. Presence of such an interleaving represents a bug-triggering interleaving, while its absence represents that the instance of the bug-pattern cannot be violated in any interleaving of the observed events.

With these principles in place, we may now discuss scenario-based modeling of bugs and corresponding encoding in MAT-based symbolic framework. Basic encoding of assertion and order violations are shown later.

Given violation constraints, denoted as $\Omega_V$, we combine them with $\Omega_{CC}$, and use SMT solver to find a witness trace on the $\Omega$.

$$\Omega := \Omega_{CC} \wedge \Omega_V \quad (1)$$

5. Improper Resource Utilization

Memory access errors specific to concurrent programs are caused by interleavings overlooked by the programmers. These errors typically are: NULL-pointer accesses, dangling pointer access, buffer overflows, uninitialized read, double and misaligned deallocation. These errors lead to either system crash and/or wrong output results.

We focus only on shared heap memory accesses that are dynamically allocated and deallocated. We consider three standard C primitives for allocation/deallocation of memory blocks: malloc, realloc and free. All other allocation and deallocation APIs specific to a language can be considered as wrapper procedure calls on these primitives.

In the following, we describe specific scenarios in concurrent setting where these errors can manifest.

NULL-pointer access (NPA): We have a NPA violation (FIG. 4(a)) when a transition setting a pointer to NULL, i.e., p=0, happens before a transition (of another thread) accessing pointer p, and no allocated memory block was associated to p in-between.

Dangling pointer access (DPA): We have a DPA violation (FIG. 4(b)) when a transition deallocates memory associated with a pointer, i.e., free(p), happens before a transition (of another thread) accessing pointer p, and no allocation was associated to p in-between.

Buffer overflow access (BOA): We have a BOA violation (FIG. 4(c)) when a transition accessing a memory location happens before all transitions (of another thread) allocating the corresponding memory block.

Double free (DF): We have a DF violation (FIG. 4(d)) when a transition deallocating a memory block happens before a transition (of another thread) deallocating the same memory block without its allocation in-between.

Misaligned free (MF): We have an MF violation (FIG. 4(e)) when a transition—setting a pointer p to an address that is different from the beginning address of any allocated memory block—happens-before a transition invoking free operation on p.

Un-initialized read (UR): We have a UR violation (FIG. 4(f)) when a transition of a thread reading a memory location for the first time happens before all transitions writing to the memory location for the first time.

We use a mem_map to keep a record of allocated entries $(i,m_i,t)$ where i denote a unique instance of memory allocation starting at the address $m_i$ occurring in a transition t. During the run, we do the following recording:

For p:=malloc(n), we add $(i,m_i,t)$, and record the following atomic assignments in a transition t, $$p := m_i$$

$$M_i := n \tag{2}$$

where $M_i$ is a new variable introduced to record the size of memory allocated.

For q:=realloc(p,n), we first find an entry $(i,m_i,t) \in$ mem_map, s.t., p corresponds to $m_i$ for some i. We need to consider two cases:

memory location unchanged. We record the following assignments in a transition.

$$q := m_i$$

$$M_i := n \tag{3}$$

memory location changed. We add $(j,m_j,t')$ and record the following atomic assignments in a transition t'.

$$M_i := 0$$

$$q := m_j$$

$$M_j := n \tag{4}$$

For free(p), we find an entry $(i,m_i,t) \in$ mem_map, s.t., $p=m_i$ for some i. We record the following assignment in a transition t'.

$$M_i := 0$$

$$VF_{t'} := vf\_cond_{t'}(p) \tag{5}$$

where $VF_{t'}$ is the Boolean flag denoting a valid free operation, and $vf\_cond_{t'}(p)$ is a place holder for an expression computed at the end of the run (discussed in the following).

For any pointer access such as x:=*p or *p:=x, we record a transition t' iff $\exists (i,m_i,t) \in$ mem_map s.t., $p=m_i+k$.

$$VM_{t'} := vm\_cond_{t'}(p,k) \tag{6}$$

where $VM_{t'}$ is a Boolean flag denoting a valid memory accesses, and $vm\_cond_{t'}(p,k)$ is a place holder for an expression computed at the end of the run.

After the run, we compute $vm\_cond_{t'}(p,k)$ for each pointer access transition t' as follows: Let $vm\_cond_{t'}(p,k):=(p>0)$ initially. For each $(i,m_i,t) \in$ mem_map s.t. $\neg (t' \prec_{HB} t)$ and $\neg (t' \prec_{po} t)$, let $vm\_cond_{t'}(p,k)$ $$vm\_cond_{t'}(p,k) := vm\_cond_{t'}(p,k) \wedge ((p=m_i+k) \rightarrow (M_i > k)) \tag{7}$$

Similarly, we compute $vf\_cond_{t'}(p)$ for each transition t' with a free operation of pointer p as follows: Let $vf\_cond_{t'}(p) :=$ false initially. For each $(i,m_i,t) \in$ mem_map, s.t. $\neg (t' \prec_{HB} t)$ and $\neg (t' \prec_{po} t)$, let $vf\_cond_{t'}(p)$ as $$vf\_cond_{t'}(p) := vf\_cond_{t'}(p) \vee ((p=m_i) \wedge (M_i > 0)) \tag{8}$$

Proposition 3. For a given CTP, if there is no NPA, BOA, and DPA violation, then for each pointer access transition t, the Boolean flag $VM_t$ remains asserted in all interleaving of a CTP.

We do not track heap memory that was not allocated dynamically, and therefore, we may miss some of these violations.

Proposition 4. For a given CTP, there is no DF/MF violation iff the Boolean flag $VF_t$ remains asserted in all interleavings of a CTP for each transition t with free operation.

Each scenario-specific violations are checked as follows:

Invalid pointer access (NPA,BOA,DPA): A violation occurs when a access pointer does not point to valid non-zero allocated memory. For each pointer access t, we check if $VM_t$ can be falsified. As per Proposition 8, $VM_t$=false if there is NPA, BOA or DPA violation.

Invalid free (DF/MF): For each access t, we check if $VF_t$ can be falsified. As per Proposition 8, $VF_t$=false iff there is a DF or MF violation.

Un-initialized read (UR): Let $fr_{i,j}/fw_{i,j}$ denote the transition where variable i is a first read/write by a thread j, respectively. The UR violation is encoded as follows:

$$\Omega_{UR} := \bigvee_i^{|\mathcal{V}|} \bigvee_j^N \bigwedge_{k \neq j}^N \Omega_{ord}(fr_{i,j}, fw_{i,k}) \tag{9}$$

where $|\mathcal{V}|$ is the number of shared variables. This is a disjunctive formula and can be solved for each $fr_{i,j}$ separately.

6. Mis-match Communication

We consider mismatch communication between synchronization pairs such as wait/notify. We consider standard C primitives for communication with a conditional variable S and a mutex lock L cond_wait(L,S)/cond_signal(S) corresponding to wait/notify. The wait is often associated with mutex lock and release. All other related API specific to a language can be considered as wrapper procedure calls on these primitives.

Mismatch communication occurs when a cond_signal(S) happens before its corresponding cond_wait(S). As a result, signal S is lost, and the thread waiting on S may not wake up or wake up late at the next notification of S. Former scenario can cause an application to stall, and the effect is commonly known as communication deadlock. Latter scenario can cause a performance bug due to delayed synchronization. Clearly, such interleavings are not intended by the programmers.

Figure 5:
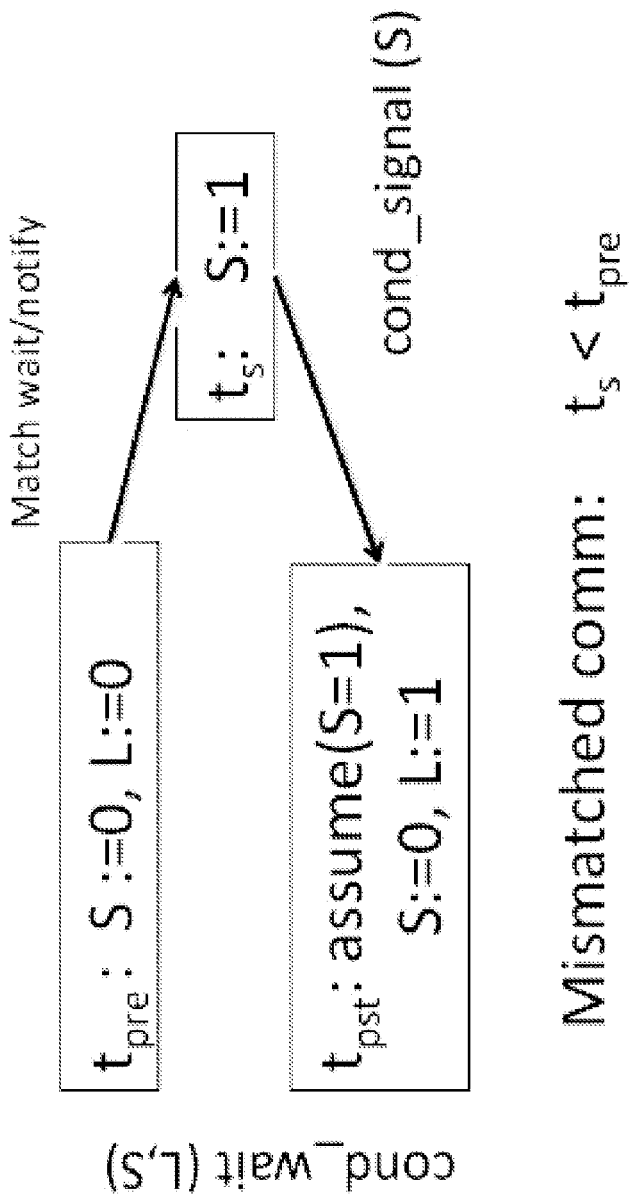
FIG. 5 is a schematic showing a mismatched wait/notify condition according to an aspect of the present disclosure.

We describe specific scenarios in concurrent setting where these errors can manifest. During the run, we do the following recording (shown in FIG. 5):

For cond_wait(L,S), record the following atomic assignments in a transition $t_{pre}$, $$L := 0$$

$$S := 0 \tag{10}$$

and record the following atomic assignment in a transition $t_{pst}$ after successful return from cond_wait.

$$\text{assume}(S=1)$$

$$S := 0$$

$$L := 1 \tag{11}$$

For cond_signal(S), we record the following atomic assignment in a transition $t_s$.

$$S := 1 \tag{12}$$

Let $(t_{pre}, t_s, t_{pst})$ denote a triplet of transitions corresponding to each matching wait/notify pair on a conditional variable S as observed in the trace. In other words, the transition $t_{pst}$ is enabled by $i_s$ that happens before it in the trace. Let W(S) denote a set of pair transitions $(t_{pre}, t_{pst})$ corresponding to each cond_wait(S). Let N(S) denote a set of transitions $t_s$ corresponding to each successful cond_signal(S). Each $(t_{pre}, t_{pst}) \in$ W(S) has a matching transition $t_s \in$ N(S). Otherway, it may not be true as some signal may be lost in the run itself. The mismatch wait/notify MWS violation is encoded as follows:

$$\Omega_{MWS} := \bigvee_S \bigvee_{(t_{pre},t_{pst}) \in W(S)} \bigwedge_{t_s \in N(S)} \Omega_{ord}(t_s, t_{pre}) \quad (13)$$

In the above equation, for each pair $(t_{pre}, t_{pst}) \in W(S)$ we can prune out a possible $t_s \in N(S)$ if $t_{pst} \prec_{HB} t_s$ or $t_{pst} \prec_{po} t_s$. In other words, we have MWS violation if there is an interleaving where all $t_s$ (of cond_signal(S))—that can happen before $t_{est}$—occurs before $t_{pre}$ (of a cond_wait(S)). This is a disjunctive formula and can be solved for each triplet separately.

7. Atomicity Violations

When a transaction is "expected" (explicitly or implicitly specified by a programmer) to be executed by a thread in an atomic code block, we refer to as an ϵ-transaction. We now define the semantic correctness of a schedule (or a run) for a given set of ϵ-transactions, denoted as ϵ-AT. A pair of ϵ-transactions t, t' is said to be executed in a serial order iff end(t) ≺ begin(t') or end(t') ≺ begin(t) in the schedule. A schedule is serial w.r.t. ϵ-AT if each ϵ-transaction is executed without interruption by other threads, i.e., in serial order. A schedule ρ is serializable w.r.t. ϵ-AT iff it is "equivalent" to some serial schedule.

There are various notions of equivalences such as 2PL, commit-order, conflict, view, and state. We focus on conflict-equivalence which has been found to uncover most of the semantic bugs in concurrent programs. However, our approach can be extended easily to other notions of equivalence.

Two schedules are conflict equivalent iff they involve the same actions of the same transactions and every pair of conflicting actions is ordered the same way. A schedule S is conflict serializable w.r.t. ϵ-AT if S is conflict equivalent to some serial schedule.

Given a schedule, one can build a conflict-graph where each node representing an ϵ-transaction has an edge to another node iff there is a conflicting transition between them. It has been shown that the conflict-graph is cycle-free iff the schedule is conflict-serializable.

Given two ϵ-transactions $[R(A)_1 \cdot W(B)_1]$ and $[W(A)_2 \cdot W(B)_2]$ and a run $\sigma = R(A)_1 \cdot W(A)_2 \cdot W(B)_2 \cdot W(B)_1$, the run σ is not conflict-serializable.

A set of ϵ-transactions, i.e., ϵ-AT is conflict-atomic iff every schedule of ϵ-AT is conflict-serializable w.r.t to all ϵ-transactions together. We use this notion of atomicity in the remainder of this disclosure.

A three-access atomicity violation occurs when a schedule $t_c \prec t_r \prec t_{c'}$ for a given ϵ-transaction $[t_c \cdot t_{c'}]$ can not be serialized as $(t_c, t_r)$ and $(t_r, t_{c'})$ are conflicting. There have been several tools that are designed to detect single variable atomicity violations. As is known by those skilled in the art, such violation occurs quite frequently.

In the following, however, multiple-variable accesses are often intended to be atomic. For example, C predicate expressions such as S->T.c !=B->T.c; multiple update assignments such as s->len++; s->buf[s->len]:=b; and shared accesses with-in lock/unlock regions involve multiple-variable accesses. Our observation are also confirmed by the bug reports that show that a significant number of concurrency bugs are due to non-atomic updates of multi-variable shared accesses.

With this intuition, we device a simple mechanism to infer the atomic boundaries based on code layout to obtain a set of ϵ-transactions.

Inferring atomic regions: Inspired by previous work, we use the following guidelines to infer atomic regions and obtain ϵ-transactions:
there are at least two accesses (same or different variable);
accesses are within a function;
accesses are less than some threshold maxD distance;
there is no happen before transition such as thread creation, wait-notify, thread join in-between;
there is no sleep delay; and
lock/unlock accesses appear in matching pairs.

We now discuss encoding to detect atomicity violation for a given set of ϵ-transactions in a given CTP using the result of MAT-analysis.

We use MAT-analysis to obtain a set of $\mathcal{J}$-transactions and their interactions. Let $\mathcal{J}$-AT denote a set of $\mathcal{J}$-transactions $i \in 1 \ldots n$ (each is numbered uniquely). Let $\mathcal{J}$-ATP denote a set of ordered pairs of $\mathcal{J}$-transactions, where in $(i,j) \in \mathcal{J}$-ATP denotes a possible context switch from i to j. To ease the presentation, we use the following notations/constants for an $\mathcal{J}$-transaction $i \in \mathcal{J}$-AT:

begin$_i$/end$_i$: the begin/end control state of i, respectively;
tid$_i$: the thread id of i;
nc_in$_i$/nc_out$_i$: a set of $\mathcal{J}$-transactions (of same thread) which immediately precede/follow i thread locally;
$C_{i,j}$: Boolean flag when true denotes that i context switches to j s.t. tid$_i \neq$ tid$_j$, and $(i,j) \in \mathcal{J}$-ATP; and
$NC_{i,j}$: Boolean flag when true denotes i is followed immediately by j s.t. $i \in$ nc_in$_j$ (or $j \in$ nc_out$_i$) (i.e., end$_i$=begin$_j$).

Given an ϵ-transaction π we obtain a set of $\{\pi_1 \ldots \pi_i \ldots \pi_{|\pi|}\}$ where $\pi_i$ is a $\mathcal{J}$-transaction, and $|\pi|$ is the length of the ϵ-transaction in terms of number of $\mathcal{J}$-transactions, so that for each transition $t \in \pi$, $\exists 1 \leq i \leq |\pi|$. $t \in \pi_i$. Note that if $|\pi|=1$, the atomicity of the ϵ-transaction is guaranteed by the MAT analysis. A necessary condition for the atomicity violation, denoted as NAV is an existence of an non-serial schedule, i.e., $$NAV := \bigvee_{\pi \in \epsilon - AT} \bigvee_{i=1}^{|\pi|-1} \neg NC_{\pi_i, \pi_{i+1}} \quad (14)$$

MAT analysis generates a set of $\mathcal{J}$-ATP such that all and only representative schedules are permitted, i.e., each of those schedules are not conflict-equivalent to each other.

Lemma 1. Every representative schedule allowed by MAT analysis has either consecutive $\mathcal{J}$-transactions (of a thread) that are atomic or there exists another $\mathcal{J}$-transaction (of another thread) that has conflict with either one of the interrupted $\mathcal{J}$-transactions.

Figure 6:
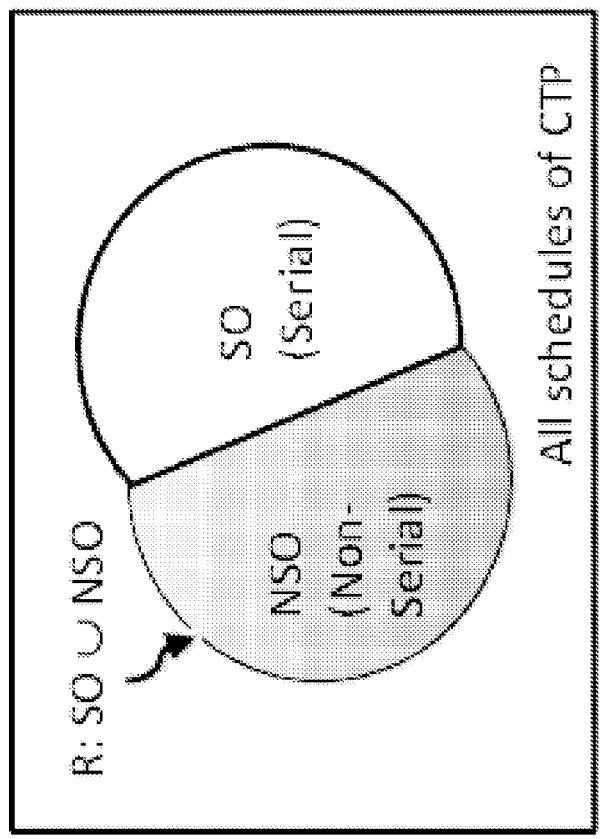
FIG. 6 is a schematic showing schedules captured using MAT-analysis according to an aspect of the present disclosure.

For a given set of ϵ-AT, Not all representative schedules captured by the set $\mathcal{J}$-AT and $\mathcal{J}$-ATP are serial w.r.t. to a given set ϵ-AT, as shown in FIG. 6. In the figure, R represent the set of representative schedules, SO ⊂ R denote the set of serial order schedules, and NSO=R\SO denote the set of non-serial order schedules. A schedule ρ ∈ NSO may be conflict-equivalent to some serial schedule ρ'∈ R̄.

We now illustrate the above using an example. Consider thread traces trace$_1$=R(X)$_1 \cdot$W(Y)$_1 \cdot \neg_1$ and trace$_2$=W(Y)$_i \cdot$W(Y)$_2 \cdot \neg_2$. Assuming, transitions $\neg_1$ and $\neg_2$ are conflicting. A MAT analysis would allow following 3 three schedules:

$$\rho_a = R(X)_1 \cdot W(Y)_1 \cdot \neg_1 \cdot W(Y)_2 \cdot W(Z)_2 \neg_2$$

$$\rho_b = W(Y)_2 \cdot R(X)_1 \cdot W(Y)_1 \cdot \neg_1 \cdot W(Y)_2 \cdot W(Z)_2 \neg_2$$

$$\rho_c = W(Y)_2 \cdot W(Z)_2 \neg_2 \cdot R(X)_1 \cdot W(Y)_1 \neg_1$$

Given an $\epsilon$-AT with only one $\epsilon$-transaction, [W(Y)$_2$·W(Z)$_2$], we obtain the corresponding $\mathcal{J}$-transactions, i.e., {W(Y)$_2$,W(Z)$_2$}. The serial schedules w.r.t. to the $\epsilon$-AT are $\rho_a$ and $\rho_c$, while the non-serial schedule is $\rho_b$. The NAV condition is therefore satisfied only by $\rho_b$. However, $\rho_b$ is conflict-equivalent to a schedule $\rho'_b$ (which is not conflict-equivalent to either $\rho_a$ or $\rho_c$).

$$\rho'_b \equiv W(Y)_2 \cdot W(Z)_2 \cdot R(X)_1 \cdot W(Y)_1 \neg_2 \neg_1$$

In general, a representative schedule need not be a serial schedule with respect to the set $\epsilon$-AT. However, if each $\epsilon$-transaction has only single access variable, then NAV can also be the sufficient condition as per the following theorem.

Theorem 1. If each $\epsilon$-transaction performs either write-all or read-all access only one shared variable, then NAV condition is both necessary and sufficient condition for atomicity violation. Proof. We show that the sufficient condition holds. Let $\rho$ be a non-serial schedule satisfying NAV condition. As per Lemma 1, for any consecutive $\mathcal{J}$-transactions (of an $\epsilon$-transaction) that are interrupted in $\rho$ (i.e., satisfying NAV condition), there exists an $\mathcal{J}$-transaction that conflicts with both the $\mathcal{J}$-transaction (which are either both write or both read). Thus, $\rho$ is not a conflict-serializable trace.

To handle the general case, we present an iterative procedure FindAtomcityViolation (as shown in Algorithm 1). Given a set of $\epsilon$-AT, we obtain the necessary violation condition NAV as per Eqn. 14. Let $\Omega_{CC}$ represent the set of concurrency constraints based on MAT analysis (as mentioned in Section 4.2). We use an SMT-solver to check if $\Omega_{CC} \wedge$ NAV' is satisfiable, where NAV' is initialized to NAV. If the check returns UNSAT, it returns NULL as there is no violation possible. On the other hand, if the check returns SAT with a trace $\rho$, we use a procedure Is_Serializable to check if $\rho$ can be serialized with respect to the given set it. If the procedure fails to find one, we found a true violation and the trace $\rho$ is returned. Otherwise, we obtain a blocking clause cls using the procedure Blocking_Cls as follows:

$$cls := \bigvee_{\pi \in \epsilon - AT} \bigvee_{i=1}^{|\pi|-1} NC'_{\pi_i, \pi_{i+1}} \quad (15)$$

Where $$NC'_{i,i+1} := (\rho(NC^i_{\pi, \pi}{}^{i+1}) = true)? \neg C^i_{\pi, j} \wedge \ldots \neg \wedge C_{k, \pi}{}^{i+1} :$$
$$NC^i_{\pi, \pi},$$

and $C_{\pi_i, j}, \ldots, C_{k, \pi_{i+1}}$ denotes all the intermediate context switches from $\pi_i$ to $\pi_{i+1}$ through $\mathcal{J}$-transactions j . . . k. We add this cls to NAV' constraints, and continue with the SMT_Check. At every step, we prune the set of non-serial schedules by eliminating serializable traces.

Note that for a special case as indicated by Theorem 6, we do not require more than one SMT_check procedure call. If there is no violation, SMT_Check returns UNSAT; otherwise it returns a trace $\rho$ violating the atomicity.

8. Experiment

We have implemented our symbolic analysis in a concurrency testing tool CONTESSA. For our experiments, we use 4 multi-threaded publicly available applications: aget, bzip, pf scan, and axel with 1-6 KLOC. These applications has a configurable parameter to set the number of concurrent threads.

We obtained corresponding concurrent trace programs (CTP), denoted as<name>-<N>-<V>, where name corresponds to the application, N corresponds to the number of threads, and V denotes the violation type: i.e., A for atomicity violation, O for order violation. For order violations, we infer potential uninitialized reads, and potential mismatch wait/notify signals. Each of these potential violations correspond to a unique shared accesses events in a CTP. Although these shared accesses may correspond to multiple executions of the same source lines, we do not differentiate them here for comparison results.

We used our symbolic encoding, denoted as quad, to generate quantifier-free SMT formula with the error conditions. We compared it with our implementation of cubic formulation, denoted as cubic. We used SMT solver Yices-1.0.28. Our experiments were conducted on a linux workstation with a 3.4 GHz CPU and 2 GB of RAM, and a time limit of 30 minutes per benchmark.

We present the comparison results in Table 1 depicted in FIG. 8. With reference to that Table 1 of FIG. 8, Column 1 lists the benchmarks. The characteristics of the corresponding CTPs are shown in Columns 2-6 as follows: the number of threads (n), the number of local variables (#L), the number of global variables (#G), the number of global accesses (#A), and the number of total transitions (#t), respectively. The results of MAT-analysis are shown in Columns 7-10 as follows: the number of MATs (#M), the number of context-switches (i.e., $\mathcal{J}$-interactions) (#C), the number of $\mathcal{J}$-transactions (#T), and the time taken (t, in sec).

The type and number of error conditions to check are shown in the Columns 11-12 respectively. Type $\bigcirc$ refers to order violation and A refers to atomicity violation condition. The result of quad(cubic) is shown in Columns 13-14 (15-16) as follows: number of satisfiable(S)/unsatisfiable(U)/unknown(?) results, and time taken (in sec).

In our comparison result, we observe that quad encoding provides a significant boost to the performance of the solver, as compared to cubic encoding. For the latter encoding, we observed frequent time-outs and mem-outs. This shows the efficacy of our encoding. We also obtained some interesting results using our framework.

In aget, all the reported violations correspond to two distinct atomicity violation in the source code. One correspond to a previously known bug which causes garbled output. The other was not reported before, but can cause garbled output as well.

In pfscan, the atomicity violation and uninitialized memory reported correspond to a scenario where an unprotected read of a result variable races with its protected update else where. This bug was not reported before, and can give a wrong output result.

For pfscan and bzip, we found some mismatch wait/notify pairs. Although, the mismatch does not stall the application, it can however affect the performance. We are still investigating those scenario. Similarly, we are investigating the uninitialized read memory and atomicity violation found in the application axel.

9. A Run of GenMAT

Figure 9:
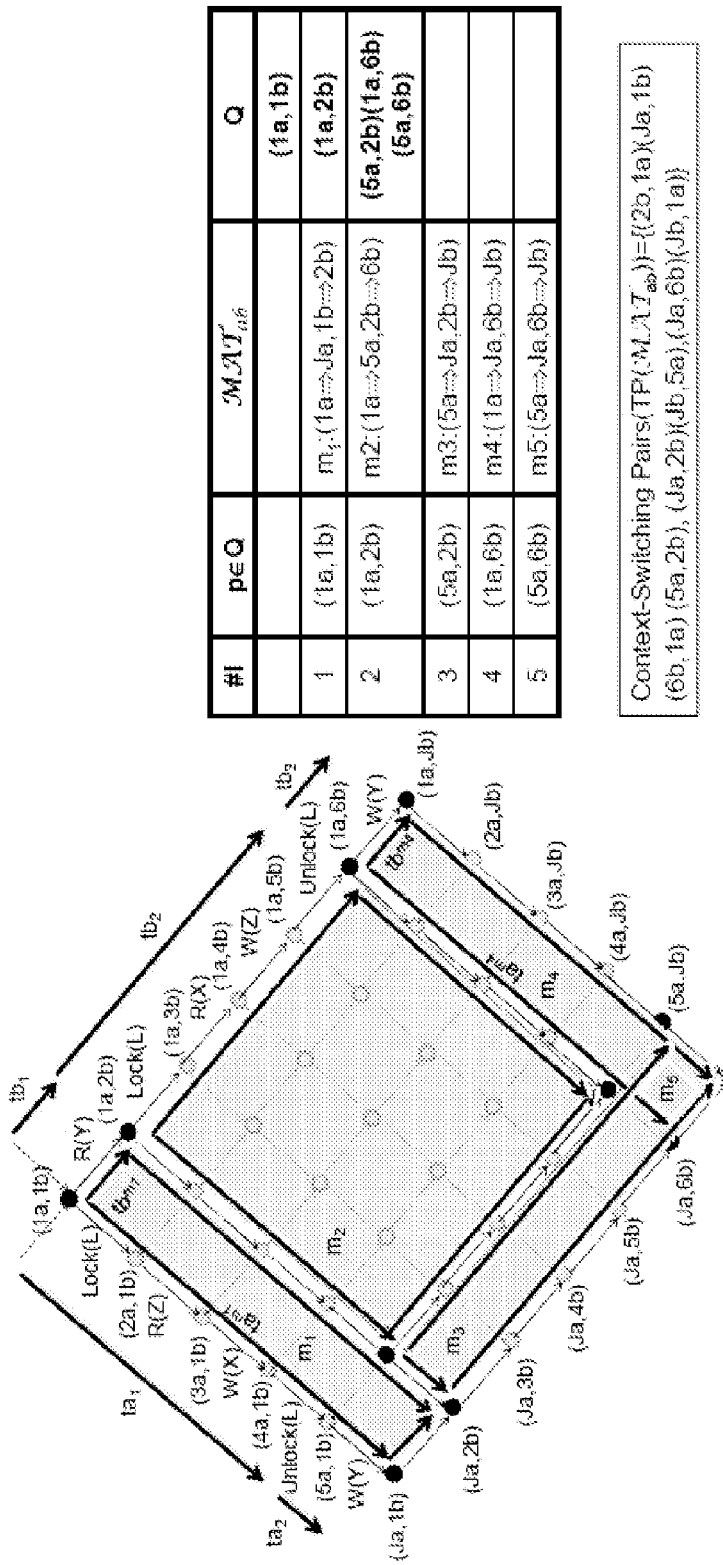
FIG. 9 depicts (a) MATs $\{m_1, \ldots, m_5\}$, and (b) a run of GenMAT according to an aspect of the present disclosure.

The GenMAT algorithm on the running example (shown in FIG. 9) proceeds as follows. It starts with the pair (1a, 1b), and identifies two MAT candidates: (1a . . . Ja, 1b·2b) and (1a·2a, 1b . . . 6b). By giving $M_b$ higher priority over $M_a$, it selects a MAT uniquely from the MAT candidates.

The choice of $M_b$ over $M_a$ is arbitrary but fixed throughout the MAT computation, which is required for the optimality result.

After selecting MAT $m_1$, it inserts in a queue Q, three control state pairs (1a, 2b), (Ja, 2b), (Ja, 1b) corresponding to the begin and the end pairs of the transactions in $m_1$. These correspond to the three corners of the rectangle $m_1$. In the next step, it pops out the pair (1a, 2b) ∈ Q, selects MAT $m_2$ using the same priority rule, and inserts three more pairs (5a, 2b), (5a, 6b), (1a, 6b) in Q.

Note that MAT (1a ... 5a, 2b·3b) is ignored as the interleaving 2b·3b·1a ... 5a is infeasible. Note that if there is no transition from a control state such as Ja, no MAT is generated from (Ja, 2b). The algorithm terminates when all the pairs in the queue (denoted as • in FIG. 9(a)) are processed.

We present the run of GenMAT in FIG. 9(b). The table columns provide each iteration step (#I), the pair p ∈ Q selected, the chosen $\mathcal{M}\mathcal{A}\mathcal{T}_{ab}$, and the new pairs added in Q (shown in bold).

Note that the order of pair insertion in the queue can be arbitrary, but the same pair is never inserted more than once. For the running example, a set $\mathcal{M}\mathcal{T}\mathcal{A}_{ab} = \{m_1, \ldots m_5\}$ of five MATs is generated. Each MAT is shown as a rectangle in FIG. 9(a). The total number of context switches allowed by the set, i.e., TP ($\mathcal{M}\mathcal{A}\mathcal{T}_{ab}$) is 8. The highlighted interleaving (shown in FIG. 9(b)) is equivalent to the representative interleaving tb$^{m_1}$·ta$^{m_1}$·tb$^{m_3}$. One can verify (the optimality) that this is the only representative schedule (of this equivalence class) permissible by the set TP ($\mathcal{M}\mathcal{A}\mathcal{T}_{ab}$).

GenMAT generates a set of MATs that captures all (i.e., adequate) and only (i.e., optimal) representative thread schedules. (For the interacting fragments of the threads). Further, its running cost is $O(N^2 \cdot k^2)$, where N is number of threads, and k is the maximum number of shared accesses in a thread.

10. Encoding Violations

We present the encoding for assertion and order violations. We use the following notations:

$\chi_c$: set of transitions beginning at control state c;

$PC_c$: Boolean flag when true denotes that the local program counter is at c;

$l_c/v_c$: symbolic value of a local (l)/global (v) variable at control state c;

$v_c?$: new symbolic variable corresponding to a global variable v at visible c;

$G_t/G_t?$: guarded symbolic expression corresponding to g(t) at invisible/visible c, respectively; and $u_t/u_t?$: update symbolic expression, a conjunction of ($v_c$=exp) for each assignment expression (v:=exp) in u(t) at invisible/visible c, respectively.

10.1. Assertion Violation

An assertion condition is associated with a transition t=(c, g,u,c') where g is the corresponding condition. A assertion violation av occurs when $PC_c$ is true and g(t) evaluates to false. We encode the assertion violation $\Omega_{av}$ as follows:

$$\Omega_{av} := PC_c \wedge \neg G \quad (16)$$

where G is $G_t$ if c is invisible; other wise G is $G_t?$.

10.2. Order Violation

Given two transitions t, t' (of different threads) such that t should happen before t' in all interleaving, one encodes the order violation condition, i.e., t' ≺ t by constraining the $\mathcal{J}$-transaction sequence where $\mathcal{J}$-transaction with transition t' occurs before the $\mathcal{J}$-transaction with transition t. Let x(t) denote a set of $\mathcal{J}$-transactions where transition t occurs. We encode the order violation condition, denoted as ord(t',t), as follows:

$$\Omega_{ord(t',t)} := \bigvee_{i \in x(t'), j \in x(t)} E_i \wedge E_j \wedge (id_i < id_j) \quad (17)$$

Note, in case t, t' are non-conflicting, we explicitly declare them conflicting to allow MAT analysis to generate corresponding context-switches.

Figure 10:
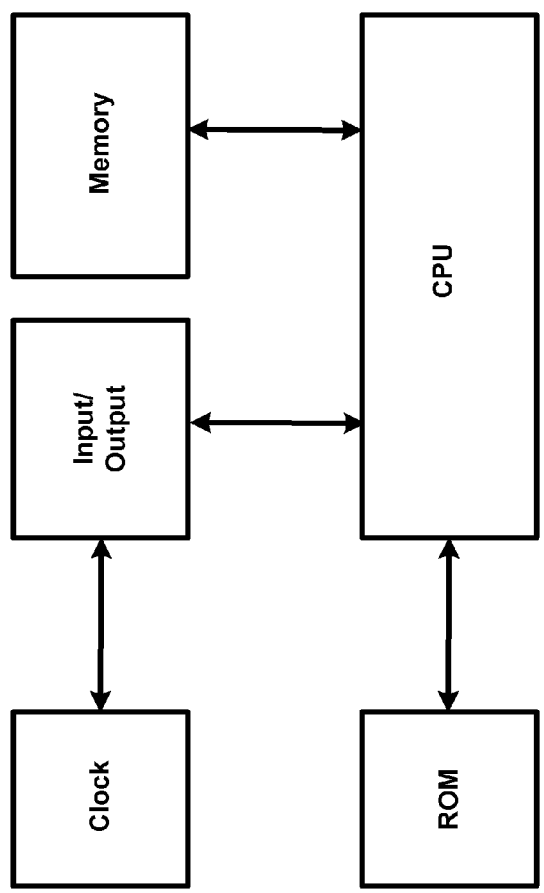
FIG. 10 is a schematic diagram depicting an exemplary computer system which may be programmed to perform operations according to an aspect of the present disclosure.

At this point, while we have discussed and described exemplary embodiments and configurations according to an aspect of the present disclosure, those skilled in the art will appreciate that such systems and methods may be implemented on computer systems such as that shown schematically in FIG. 10 and that a number of variations to those described are possible and contemplated.

Figure 11:
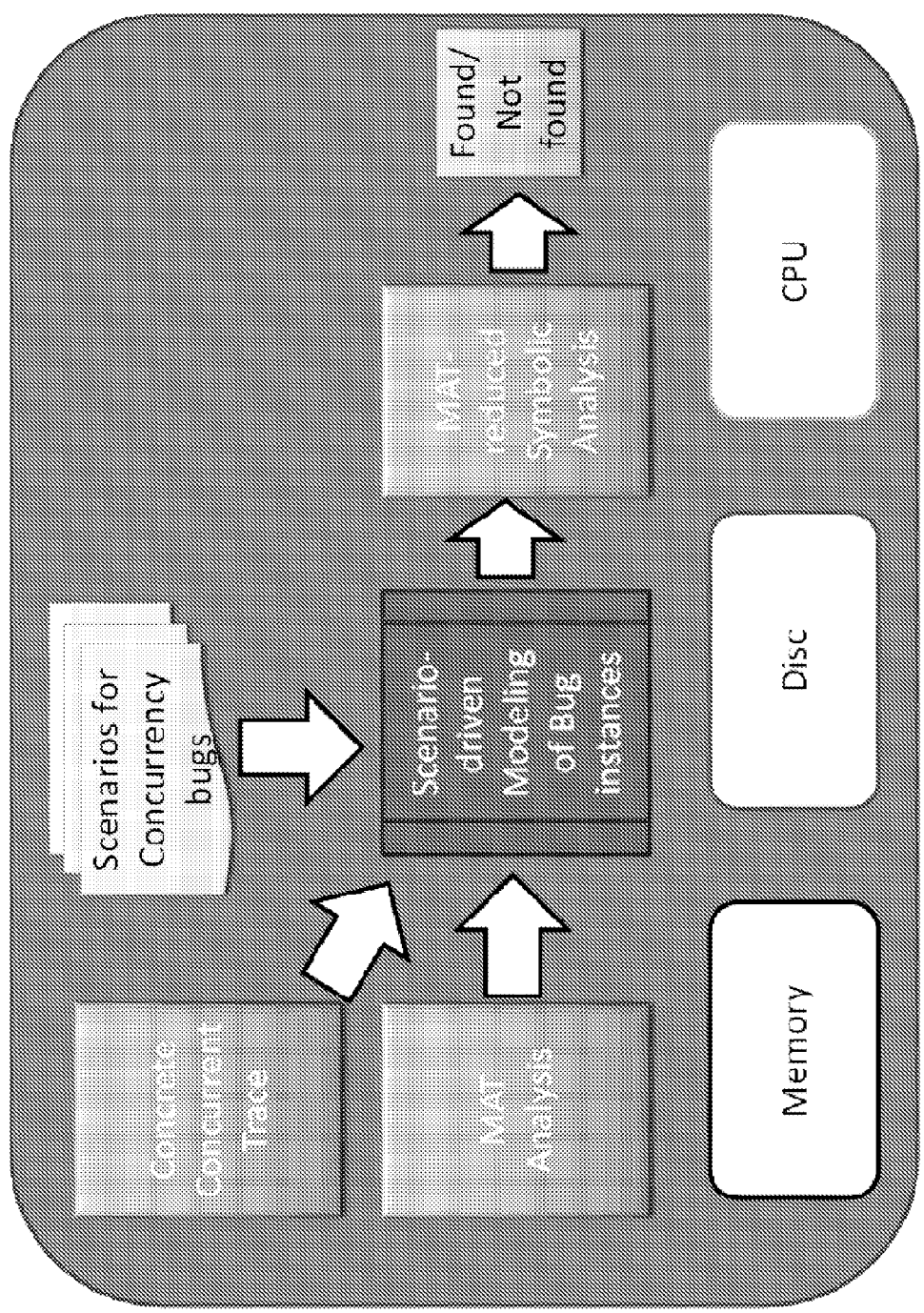
FIG. 11 is a schematic diagram depicting an exemplary operation of the method of the present disclosure operating on a representative computer system.

Accordingly, and as depicted schematically in FIG. 11, a computer system such as that shown in FIG. 10 may be programmed to perform the MAT analysis and scenario-driven modeling of bug instances utilizing scenarios or concurrency bugs according to the present disclosure. As so programmed, a MAT-reduced symbolic analysis identifies concurrency bugs in a concurrent program.

Figure 12:
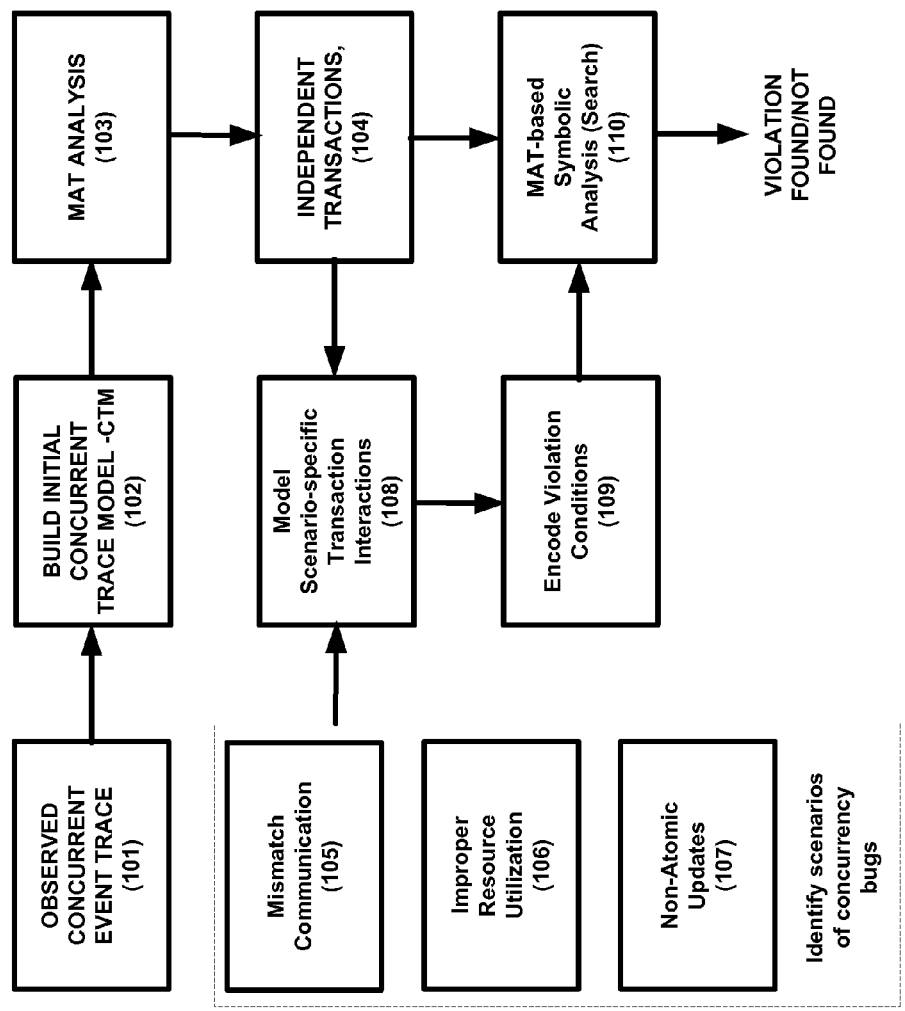
FIG. 12 is a flow diagram depicting exemplary steps of a method according to the present disclosure.

FIG. 12 is a flow diagram depicting more particularly steps associated with the present invention. With reference to that FIG. 12, given an observed concurrent event trace (block 101) corresponding to an execution of a concurrent program, the trace information is used to build an initial concurrent trace model (CTM) (block 102). A MAT analysis is performed on the CTM (block 103) to obtain a set of independent transactions and their interactions (block 104).

Next, we identify specific scenarios of bug patterns (blocks 105-107) that correspond to program errors commonly cited in bug reports. For bug patterns identified as mismatch communication (block 105) we generate specific instances corresponding to mismatched wait/notify, lock/unlock, send/receive synchronication pairs. We also infer implicit synchronization induced by sleep calls.

For bug patterns identified as improper resource utilization (block 106), we generate specific instances corresponding to various shared heap memory access errors.

For bug patterns identified as non-atomic update (block 107), we generate specific instances based on inferring atomic region based on code layout and correlation of shared variables.

Figure 13:
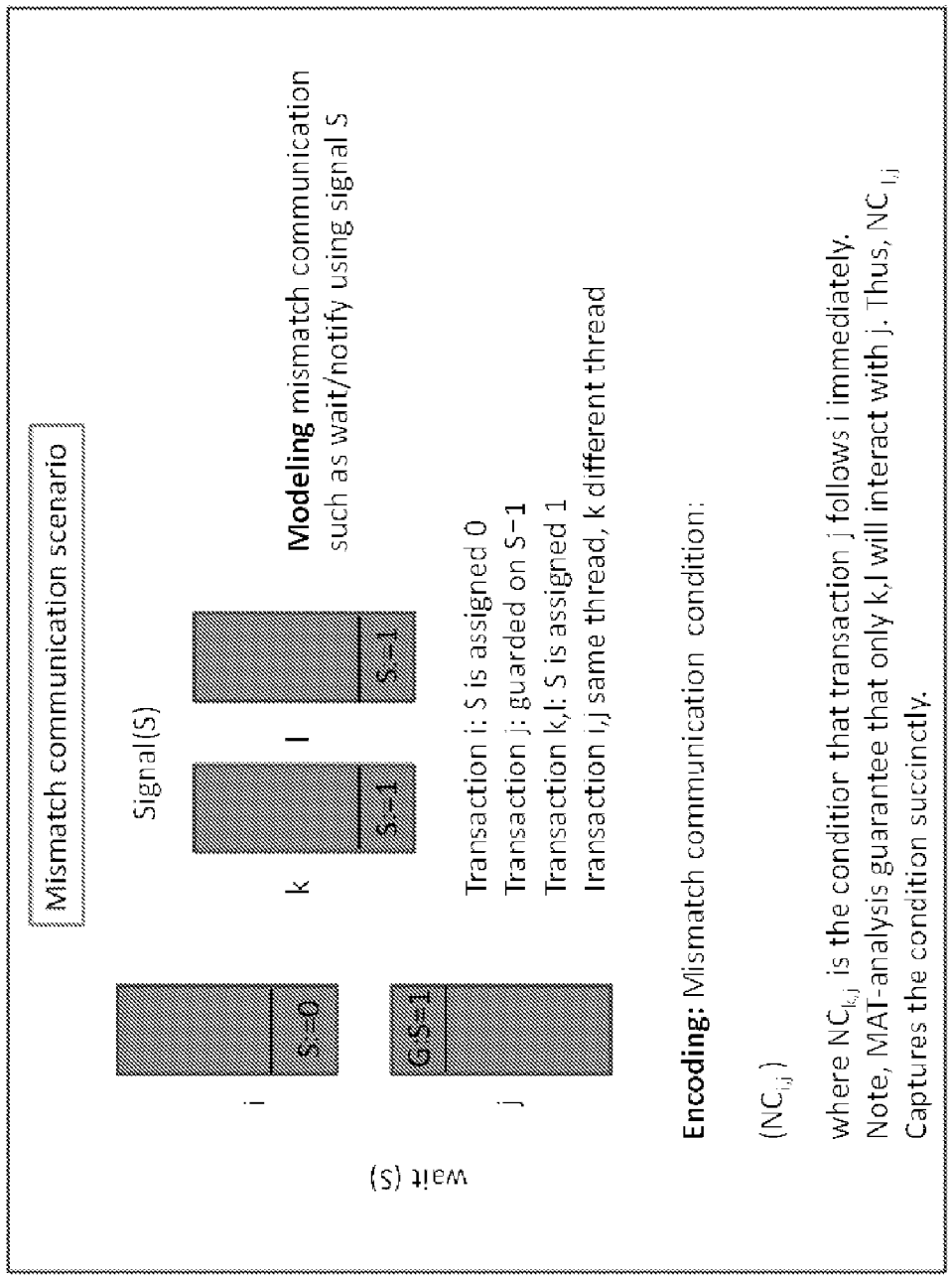
FIG. 13 is a schematic diagram depicting modeling and encoding of a mismatch communication scenario according to an aspect of the present disclosure.
Figure 15:
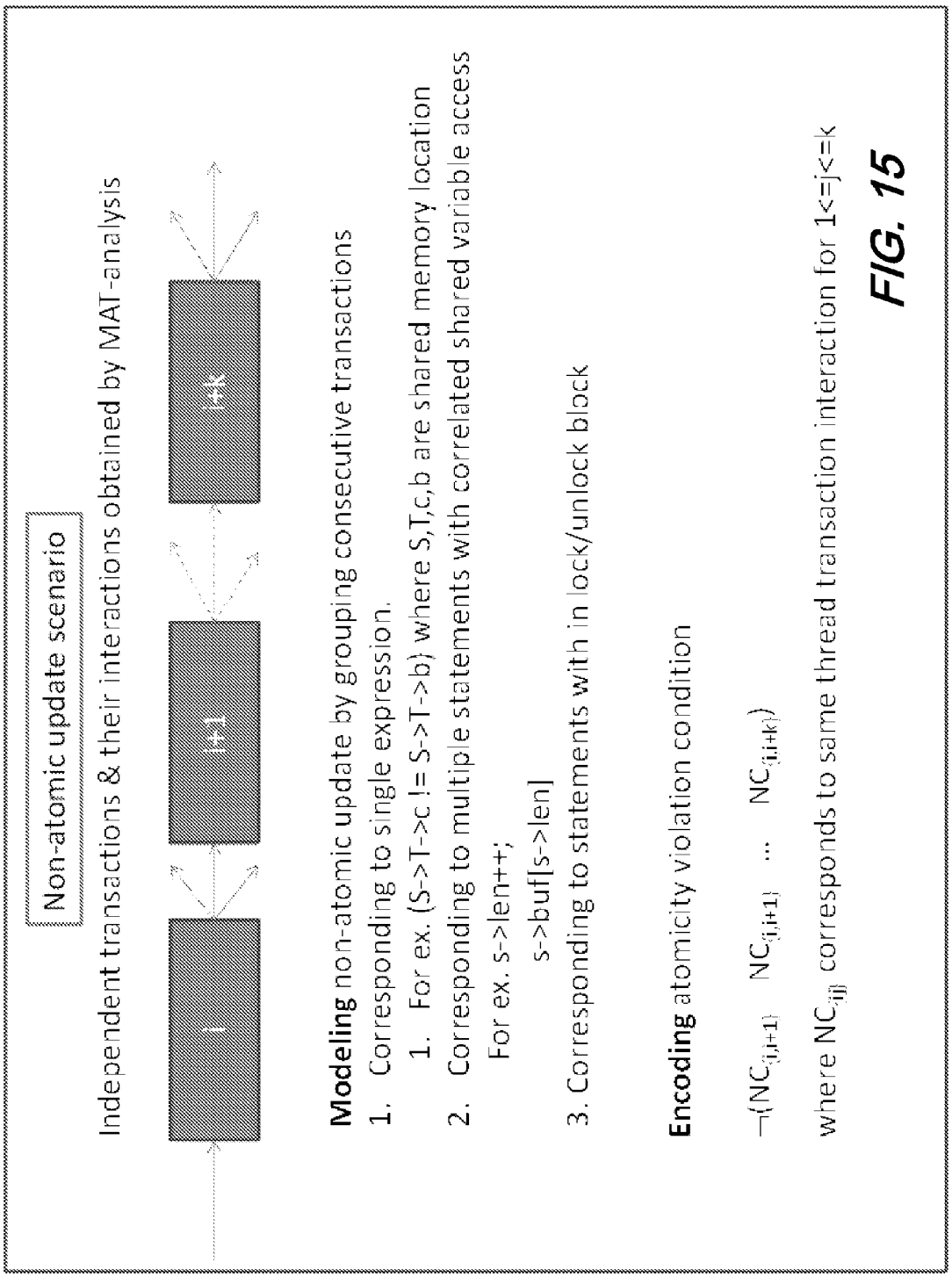
FIG. 15 is a schematic diagram depicting modeling and encoding of a non-atomic update scenario according to an aspect of the present disclosure.

For each specific scenario of bug pattern (blocks 105-107), we model transaction interactions corresponding to an instance of the bug pattern (block 108). Such specific modeling are shown for mismatch communication, improper resource utilization and non-atomic updates in FIG. 13, FIG. 14 and FIG. 15, respectively.

We encode the modeled violation conditions corresponding to each bug instance into a quantifier-free SMT formula (block 109). The encoded formula is provided to a MAT-based symbolic analysis using the encoded violation condition as property constraints to search for a feasible interleaving (block 110). The presence of such an interleaving represents a bug-triggering interleaving, while its absence represents that the instance of the bug pattern cannot be violated in any interleaving of the observed events.

With these principles in place, this disclosure should be viewed as limited only by the scope of the claims that follow.

The invention claimed is:

1. A computer implemented method for identifying concurrency errors in a concurrent software program comprising the steps of:

constructing an initial concurrent trace model (CTM) from an observed concurrent event trace of the concurrent software program;

obtaining a set of independent transactions and a set of ordered pairs between the independent transactions by performing a mutually atomic transaction (MAT) analysis on the CTM;

identifying specific scenarios of errors that may correspond to concurrency errors;

generating a transaction interaction model for each of the scenarios identified;

encoding violation conditions for each of the scenarios and generating a quantifier-free satisfiability modulo theory (SMT) formula including the encoded violation conditions;

determining any feasible interleaving meeting one or more violation conditions through the effect of a SMT solver on the SMT formula; and outputting any indicia of the interleaving.

2. A computer implemented method according to claim 1, wherein the scenario specific errors include mismatch communication, improper resource utilization, and atomicity violation.

3. The computer implemented method according to claim 2 wherein the mismatch communication scenario generates specific instances corresponding to mismatched wait/notify, and send/receive synchronization pairs.

4. The computer implemented method according to claim 2 wherein the improper resource utilization scenario generates specific instances corresponding to various shared heap memory access errors.

5. The computer implemented method according to claim 2 wherein the atomicity violation scenario generates specific instances of non-atomic updates of inferred atomic regions comprising multiple shared accesses.

6. The computer implemented method according to claim 5 wherein the inferred atomic region is obtained from a code layout and a correlation of shared variables.

\* \* \* \* \*